United States Patent [19]
Greenwich

[11] Patent Number: 5,660,296
[45] Date of Patent: Aug. 26, 1997

[54] MOBILE COOLER HAVING A REMOVABLE COVER USABLE AS A CHAIR

[76] Inventor: Ryan E. Greenwich, 3 Franklin Rd., Boxford, Mass. 01921

[21] Appl. No.: 526,590

[22] Filed: Sep. 11, 1995

[51] Int. Cl.⁶ .................... B65D 45/00; F25D 3/08
[52] U.S. Cl. .............. 220/326; 62/457.7; 280/47.26; 297/188.08; 297/188.13; 312/235.4; 312/237; 312/240
[58] Field of Search .............. 62/457.7; 312/235.2, 312/235.4, 235.7, 237, 240; 297/188.08, 188.11, 188.13, 433.26; 190/1, 18 A, 109, 115; 280/37, 47.26; 220/326

[56] References Cited

U.S. PATENT DOCUMENTS

| | | | |
|---|---|---|---|
| 1,709,459 | 4/1929 | Callahan | 220/326 X |
| 2,264,744 | 12/1941 | Dunnam | 312/235.4 |
| 3,114,574 | 12/1963 | Pryale | 312/235.2 |
| 3,128,137 | 4/1964 | Dokter | 297/188.08 |
| 3,232,686 | 2/1966 | Syler | 297/188.08 X |
| 4,299,313 | 11/1981 | Null | 190/115 X |
| 5,269,157 | 12/1993 | Ciminelli et al. | 62/457.7 |
| 5,318,315 | 6/1994 | White et al. | 280/47.26 |
| 5,460,288 | 10/1995 | Balzeau | 220/326 |

*Primary Examiner*—Gary E. Elkins
*Attorney, Agent, or Firm*—Frederick R. Cantor, Esq.

[57] ABSTRACT

A mobile cooler includes a container that is partitioned to form a cold compartment and a non-cooled compartment. A cover is removably mounted on the container to overlie both compartments. In one position, the cover can function as a small chair. In an alternate position the cover is held close against the container to facilitate compact storage of the cooler in a minimum space, and easy towing of the cooler from one place to another place.

4 Claims, 3 Drawing Sheets

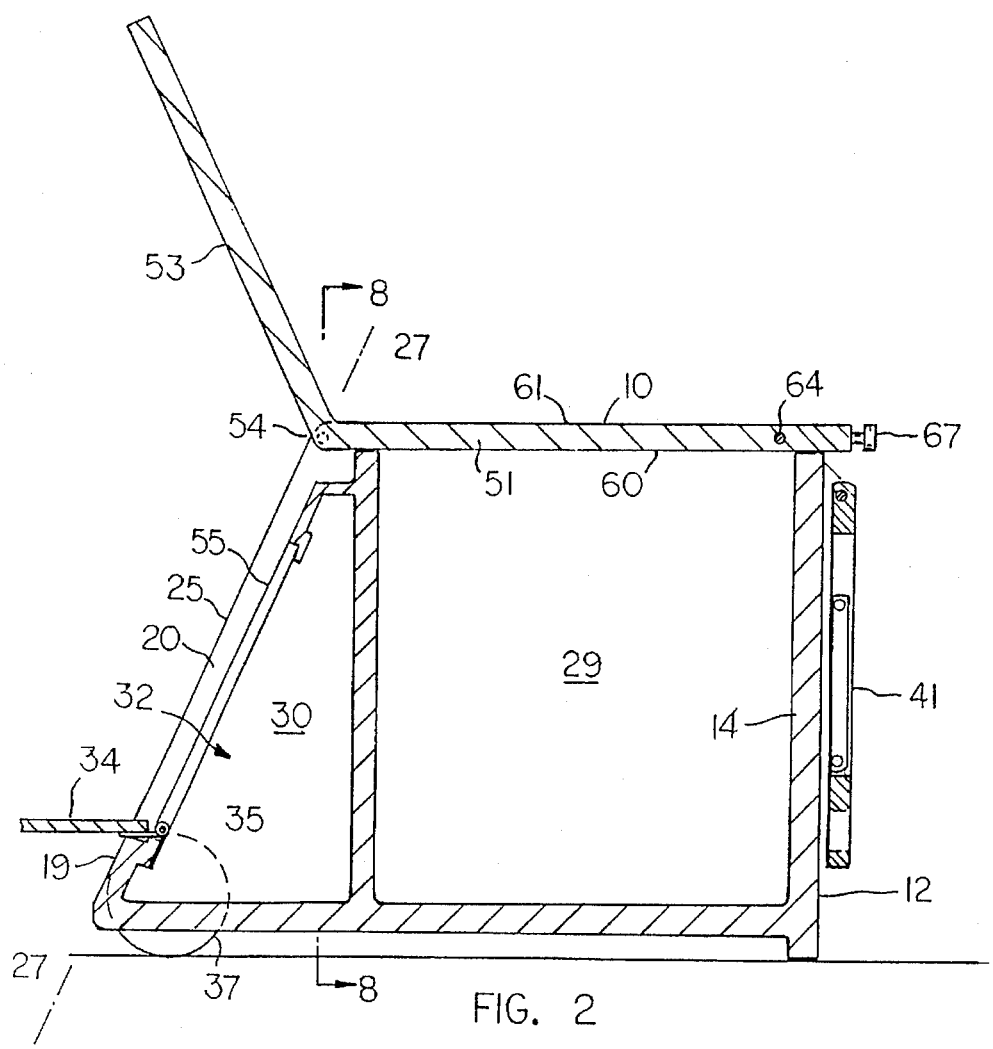
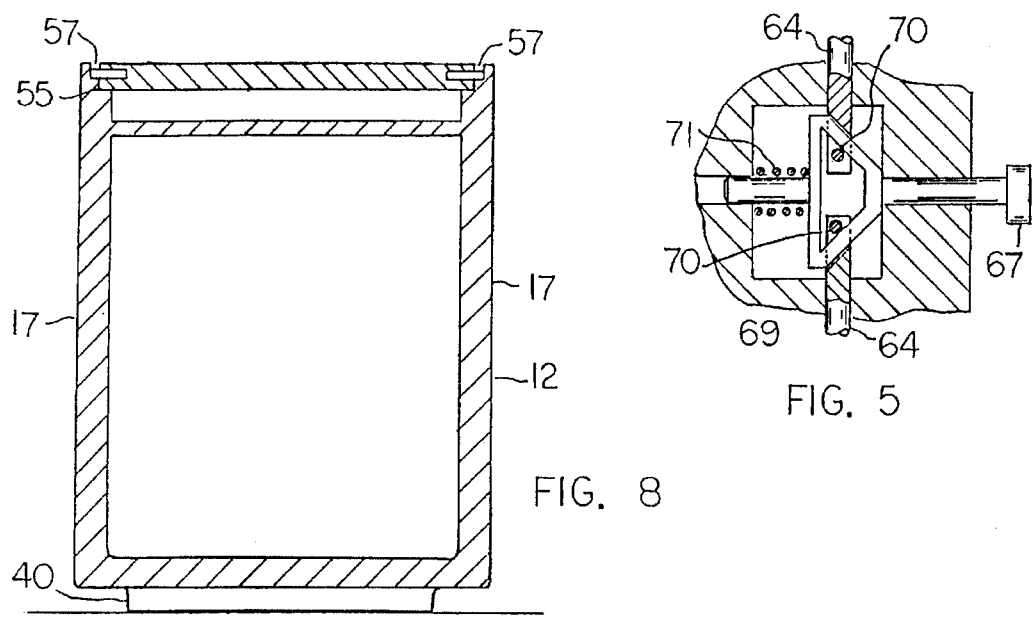

MOBILE COOLER HAVING A REMOVABLE COVER USABLE AS A CHAIR

BACKGROUND OF THE PRESENT INVENTION

SUMMARY OF THE PRESENT INVENTION

The present invention relates to mobile coolers, and, more particularly to a mobile cooler having two ground wheels and a pulling handle, whereby the person is enabled to pull the cooler from place to place, rather than having to lift and carry the cooler in his/her arms. The ground mobility feature lessens the physical strain on the person, since the cooler (load) is supported on the ground, not on the person. The person does not have to bend over and physically lift the cooler, possibly generating excess strain on his back, arms and shoulders. Also, the cooler can be somewhat larger, since the cooler size is no longer dictated by the person's arm reach and manual grip capability.

The term "cooler" is herein intended to mean a container for foods and beverages, wherein some means is provided for cooling the container interior space, whereby the contained foods and beverages are cooled so as to keep them edible and fresh over a period of time, e.g. four or five hours. Such coolers are often used for picnics, special outings, or trips away from home, when it is desired to consume foods and beverages without having to stop at a restaurant. Ice and cold packs are commonly used in such coolers to keep the food and beverages in a cold condition.

Mobile coolers having ground wheels and pulling handles have already been proposed. However, such coolers are not usually designed to contain items that are not intended to be cooled, e.g. suntan lotion, magazines, sporting equipment, billfolds, towels, etc. The present invention relates to a mobile cooler having two separate compartments, whereby food and beverages can be kept in a cooled condition in one of the compartments, while other items can be stored in a non-cooled condition in the other compartment. The present invention thus increases the versatility and usefulness of the mobile cooler.

As a further feature of the present invention, the mobile cooler includes a removable cover that can be used as a seat for the person owning or possessing the cooler. The cover includes a front section adapted to overlie the cold compartment of the container, and a rear section angling upwardly from the front section, whereby a person is enabled to sit on the front section of the cover while leaning back against the rear section of the cover in a resting position. The cover thereby functions as a small chair.

The mobile cooler of the present invention has multiple usage as a cold storage container, room temperature storage container, and portable chair. The cooler is equipped with wheels and a puller handle, whereby a person can pull, or tow, the cooler from place to place, without having to physically lift the container from the ground. When the cooler is in a stationary position it can be used as a small chair. The cooler comprises a removable cover that can be reversed and pivotably supported on the container when it is desired to use the cover as a chair.

The pivotably mounted cover can be swung around its pivot axis when it is desired to gain access to the cold compartment in the container. A manual latch means is provided on the cover to prevent the cover from uncontrolled swinging action when the cover is being used as a chair.

The present invention is particularly concerned with the cover pivot means and the cover latch means, whereby the cover can be removed from the container, or pivotably operated between two conditions, or latched in place in two selected positions. The pivot mechanisms and latch mechanisms are designed for operation or usage by average persons having no special engineering knowledge or physical dexterity skills.

Further features, advantages and constructional details of a representative embodiment of the invention will become apparent from the attached drawings and related description thereof.

In summary, and in accordance with the above discussion, the foregoing objectives are achieved in the following embodiments.

A BRIEF DESCRIPTION OF THE DRAWINGS

FIG. 2, is a view, taken in the same direction as FIG. 1, but showing the cooler in a stationary position, whereby the cooler cover is usable as a small chair.

FIG. 5, is an enlarged fragmentary view, of a manually operable latch mechanism used in the FIG. 1 cooler to hold the cover of the cooler in a closed position (as shown in FIG. 1 or FIG. 2).

FIG. 6 is taken with the cover in the FIG. 3 position.

FIG. 8, is a transverse sectional view, taken approximately on line 8—8 in FIG. 2.

DESCRIPTION OF THE PREFERRED EMBODIMENTS OF THE INVENTION

Figure 1:
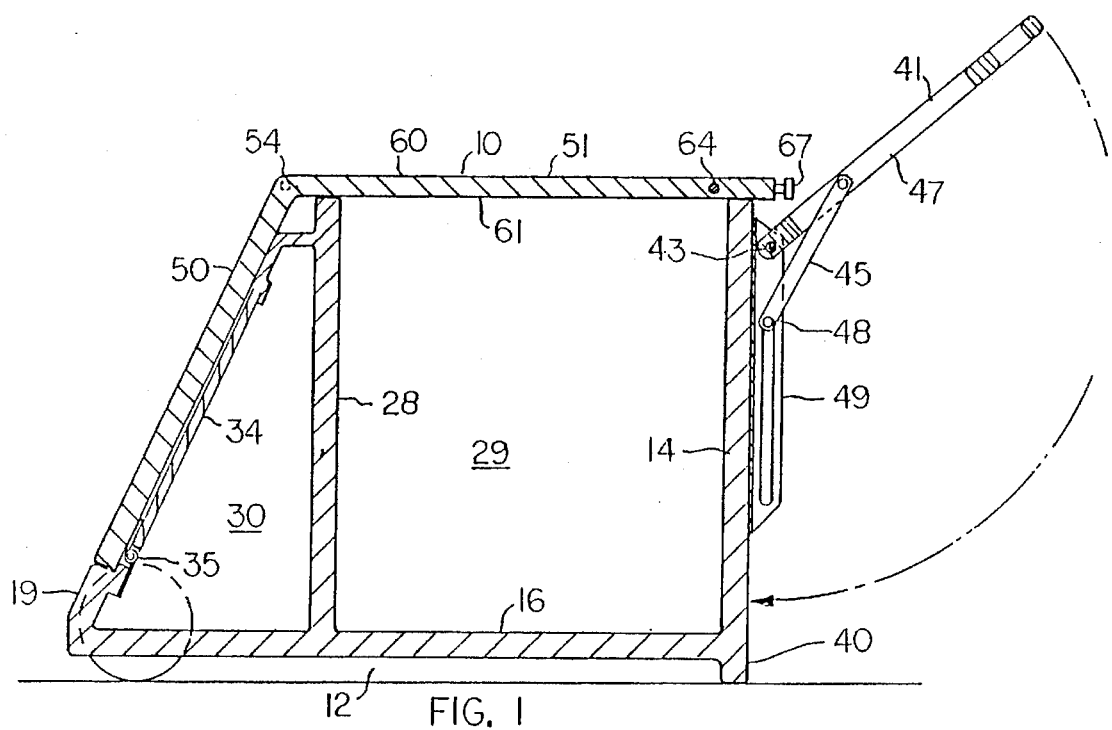
FIG. 1, is a sectional view, taken through a mobile cooler embodying the invention. The cooler is shown in the so-called towing position, wherein a person can pull the cooler over the ground surface in a left-to-right direction.

FIG. 1, is a sectional view, taken through a mobile cooler embodying the invention. The cooler is shown in the so-called towing position, wherein a person can pull the cooler over the ground surface in a left-to-right direction.

FIG. 2, is a view, taken in the same direction as FIG. 1, but showing the cooler in a stationary position, whereby the cooler cover is usable as a small chair.

Figure 3:
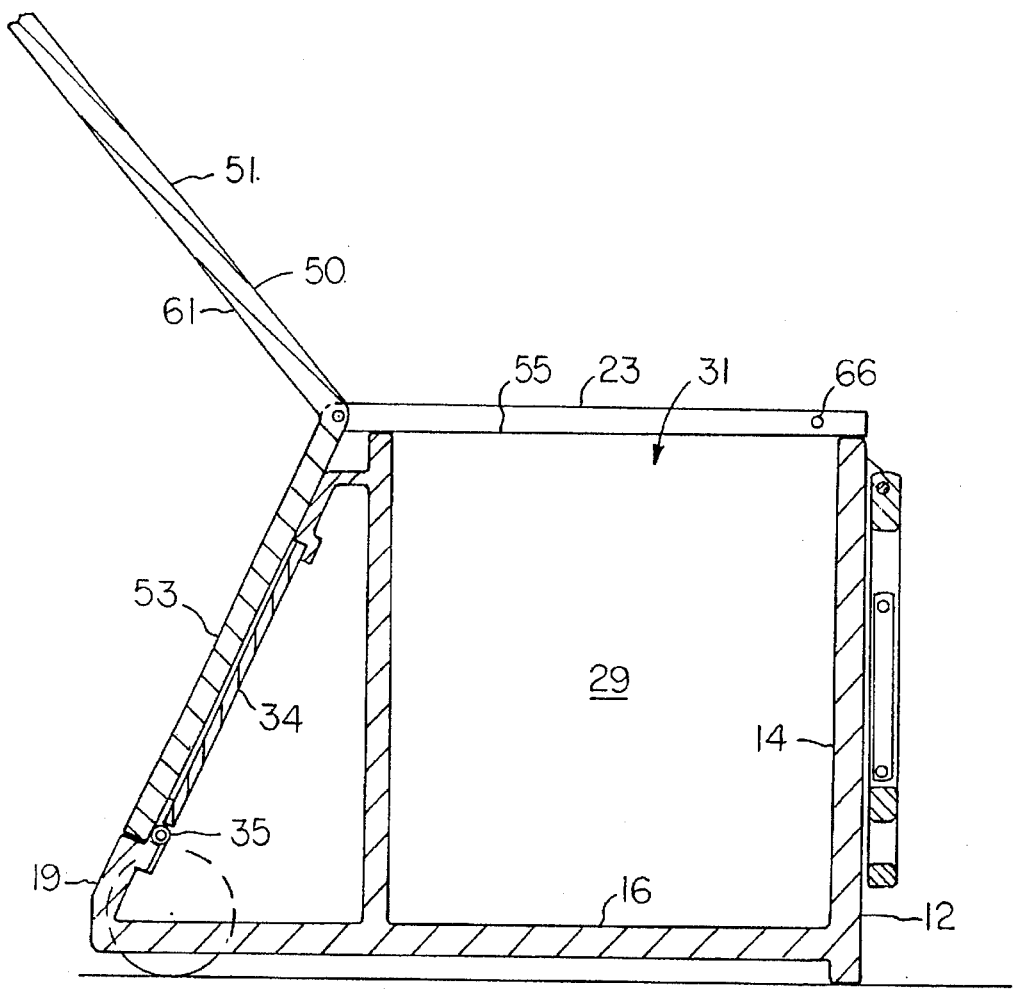
FIG. 3, is a view, taken in the same direction as FIGS. 1 and 2, but showing the cover swung rearwardly (leftwardly) for access to the cold compartment of the cooler.

FIG. 3, is a view, taken in the same direction as FIGS. 1 and 2, but showing the cover swing rearwardly (leftwardly) for access to the cold compartment of the cooler.

The drawings show a mobile cooler 10 that includes a container 12 having an upstanding front wall 14, a bottom wall 16, two vertical side walls 17, and a forwardly sloped rear wall 19. As shown in FIG. 2, rear wall 19 has an upper edge located an appreciable distance below the upper limit of container 12, such that a vacant space (or opening) 20 is formed above wall 19 between the two side walls 17.

Each side wall 17, has an upper edge that extends horizontally from front wall 14 to a point in the plane of rear wall 19, then angularly downwardly along the plane of rear wall 19. In the drawings, the horizontal upper edge area of each side wall 17 is designated by numeral 23; the downwardly sloped upper edge area of each side wall 17 is designated by numeral 25. The plane of rear wall 19 is indicated by numeral 27.

An upright partition 28 extends between side walls 17 forwardly from rear wall 19 to form a front compartment 29 and a rear compartment 30. Compartment 29 is accessible from above the container, as indicated by arrow 31 in FIG. 3. Compartment 30 is accessible through the rear wall 19, i.e. through vacant space 20. Access to compartment 30 is indicated by arrow 32 in FIG. 2.

An auxiliary interior closure 34 is provided for containment of items within compartment 30. As shown in the drawing, closure 34 has a hinged connection 35 with the container rear wall 19, whereby the closure 34 can be swung around the hinged connection between the open and closed positions. FIG. 2 shows the auxiliary closure 34 in its open position. FIGS. 1 and 3 show closure 34 in its closed position.

Front compartment 29 will be used to store food and beverages that are required to be kept in a cold, or frozen condition, e.g. sandwiches, ice cream bars, pop, beer, etc. Typically, ice or a number of cold packs will be placed in compartment 29 prior to insertion of the food and beverages into compartment 29.

Rear compartment 30 is used to store items that are to be kept at ambient (or room) temperature. Such items could, e.g., be a person's keys, book, hat, sweater, towel, or suntan lotion, that the person would like to have available at the place where the cooler is to be taken, such as a picnic site, camp site, or beach area.

The cooler has mobility by way of two small rubber-tired wheels 37 located alongside the container side walls 17 proximate to rear wall 19. Each wheel 37 can be rotatably mounted on a stub axle (not shown) extending from the respective side wall 17. When the cooler is in its stationary condition, the container is supported by wheels 37, and a foot structure 40 located at the front wall 14 of the container. Foot structure 40 is of sufficient height as to support the container in a condition wherein bottom wall 16 of the container is in a level attitude (when the cooler is located on level terrain).

The walls of container 12 are preferably formed of materials having heat insulation capabilities. Typically, each wall can comprise outer skin members of sheet metal or sheet plastic, and interior insulation foam or fiberglass batting materials. The drawings show the container walls in simplified fashion in order to better illustrate the wall arrangements.

A towing handle 41 has a pivotal connection 43 with the front wall 14 of the container 12, such that the handle 41 has a towing position extending forwardly from the container 12 (as in FIG. 1), or an inactive position extending downwardly along the container front wall (as in FIGS. 2 and 3). The swinging motion of handle 41 in the up direction can be limited by a pivotable link 45 located in a slot 47 in the handle 41. One end of link 45 is pivotably connected to the handle 41; the other end of link 45 comprises a pin 48 that slides in elongated slots in a mounting bracket 49.

Compartments 29 and 30 are closed by a removable cover 50, that includes a front section 51 adapted to overlie compartment 29, and a rear section 53 adapted to extend across the rear compartment 30. FIG. 1 shows the cover in its closed position for closing compartments 29 and 30 while the cooler is in the towing mode. FIG. 2 shows cover 50 in a reversed position, wherein rear section 53 of the cover extends angularly upwardly from front section 51 to form a seat back; the cover 50 thus forms a miniature chair. FIG. 3 shows cover 53 in the reversed "chair" position, but with the cover swung upwardly around a pivot structure 54 to provide access to front compartment 29.

Upper edge areas 23 and 25 of the container side walls 17 are longitudinally recessed from front wall 14 to the upper edge of rear wall 19, to form support ledges 55 for cover 50. Side edge areas of the cover are seatable on ledges 55 so as to be removably engaged with the container 12.

Sockets 57 are formed in the upper edges of container side walls 17 proximate to the plane of rear wall 19, i.e. at the point where horizontal edge area 23 joins the sloped edge area 25. The cover 50 has two cylindrical pivot pins 59 extending into the respective sockets 57, such that when the cover 50 is in its "reversed" position (FIG. 2 or FIG. 3) the cover can be swung around the pivot pin 59 axis. Sockets 57 and pivot pins 59 collectively form the above-mentioned pivot structure 54.

Figures 6, 7:
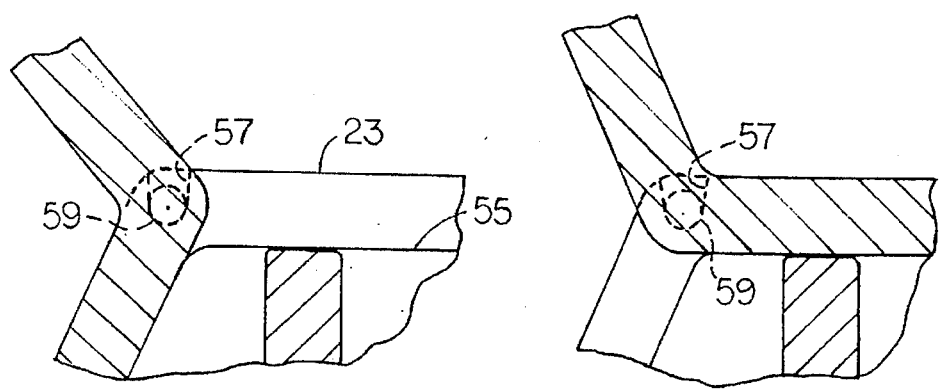
FIG. 6, is an enlarged fragmentary view, of a cover pivot mechanism used in the FIG.1 cooler.
FIG. 7, is a view, taken in the same direction as FIG. 6, but with the cover tilted forwardly to the FIG. 2 position.

FIG. 6, is an enlarged fragmentary view, of a cover pivot mechanism used in the FIG. 1 cooler. FIG. 6 is taken with the cover in the FIG. 3 position.

FIG. 7, is a view, taken in the same direction as FIG. 6, but with the cover tilted forwardly to the FIG. 2 position.

The shape and location of sockets 57 is best seen in FIGS. 6 and 7. As there shown, the sockets have cylindrical surfaces underlying the surfaces of pivot pins 59 to act as journals for the pivot pins 59. The pins 59 are freely turnable in the sockets 57 while being capable of being lifted out of the sockets to facilitate disengagement of the cover 50 from the container.

As noted above, the cover can be reversed relative to the container. The term "reversed" is herein used to indicate a turning of the cover, such that the lower major surface of the cover becomes the upper surface, and vice versa. In the drawing one surface of the cover is designated by numeral 60; the other major surface of the cover is designated by numeral 61.

As shown in FIG. 1, surface 60 of cover 50 is the upper surface, and surface 61 is the lower surface. FIGS. 2 and 3 show the cover in its so-called "reversed" position, wherein surface 61 is the upper surface, and surface 60 is the lower surface. The cover reversing operation is accomplished by lifting the cover from the container, and turning it over so that pins 59 engage in different sockets 57, i.e. the leftmost pin is switched into the rightmost socket, and the rightmost pin is switched into the leftmost socket.

Figure 4:
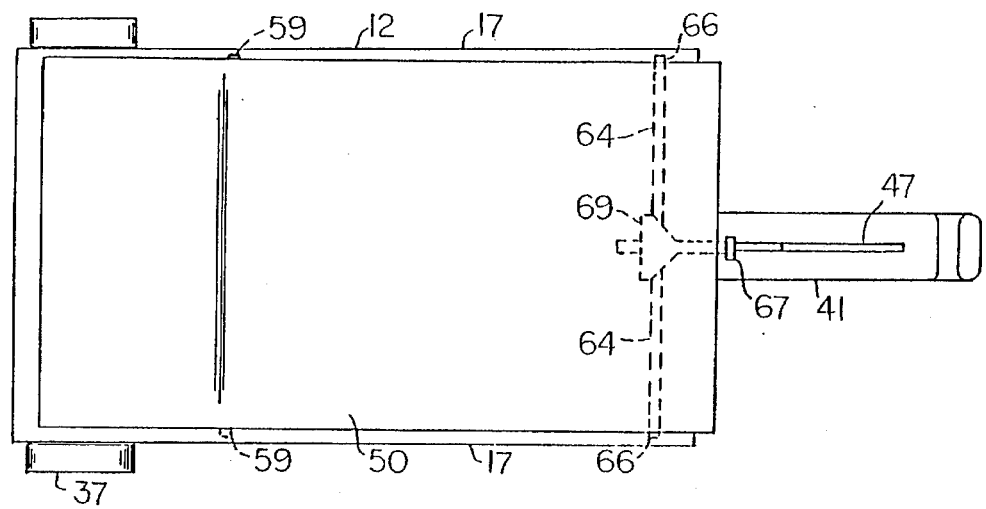
FIG. 4, is a top plan view, of the FIG. 1 cooler.

FIG. 4, is a top plan view, of the FIG. 1 cooler.

A latching means is provided for locking the cover in the position of FIG. 1 or FIG. 2. As shown in FIG. 4, the latching means comprises two slidable latch rods 64 movable in opposite directions so that the outer ends of the rods enter into pockets 66 in side walls 17. These rods 64 are linked to a manual pushbutton 67, whereby manual pressure on the pushbutton 67 draws the rods 64 out of pockets 66, thereby unlocking the latch means.

FIG. 5, is an enlarged fragmentary view, of a manually operable latch mechanism used in the FIG. 1 cooler to hold the cover of the cooler in a closed position (as shown in FIG. 1 or FIG. 2).

FIG. 5, shows one type of linkage that can be used between the latch rods 64 and the pushbutton 67. The pushbutton 67 has a triangular cam plate 69 that extends within slots in the ends of rods 64. Transverse pins 70 extend through rods 64 across the slots in contact with edge areas of the cam plate 69. Manual movement of pushbutton 67 to the left (in FIG. 5) produces a cam action of plate 69 on cam follower pins 70, whereby the latch rods 64 are drawn toward each other (and out of pockets 66). When the manual pressure is removed from pushbutton 67, a coil spring 71 returns the cam mechanism and latch rods 64 to the initial position.

The latch mechanism is used when it is desired to remove the cover 50 from container 12. The latch mechanism is also used when it is desired to gain access to compartment 29, i.e., when it is desired to swing the cover from the FIG. 2 position to the FIG. 3 position.

By way of summarization, FIG. 1 shows the cooler 10 in its towing position. The person grasps handle 41 and pulls the cooler rightwardly over the terrain to any desired location. FIG. 2 shows the cooler in its usage position, wherein cover 50 is reversed from the FIG. 1 position; the cover 50 here functions as a small chair. FIG. 3 shows the cooler in the same position as FIG. 2, except that the cover has been swung in a counterclockwise arc around pivot structure 54, to gain access to the front compartment 29. Access to rear compartment 30 is also possible when the cover 50 is in the FIG. 2 position.

The present invention is concerned primarily with the pivot structure 54 and the latch mechanism shown in FIGS. 4 and 5. These features enable the cooler to perform its desired multiple functions; i.e. cold storage in compartment 29, ambient temperature in compartment 30, and the chair function depicted in FIG. 2. The latch mechanism stabilizes cover 50 against overturnment when the cover is in the chair position.

The present invention, described above, relates to a mobile cooler. Features of the present invention are recited in the appended claims. The drawings contained herein necessarily depict structural features and embodiments of the mobile cooler, useful in the practice of the present invention.

However, it will be appreciated by those skilled in the arts pertaining thereto, that the present invention can be practiced in various alternate forms and configurations. Further, the previous detailed descriptions of the preferred embodiments of the present invention are presented for purposes of clarity of understanding only, and no unnecessary limitations should be implied therefrom. Finally, all appropriate mechanical and functional equivalents to the above, which may be obvious to those skilled in the arts pertaining thereto, are considered to be encompassed within the claims of the present invention.

What is claimed is:

1. A mobile cooler comprising:

a container that includes an upstanding front wall, a forwardly sloped rear wall, two parallel side walls interconnecting said front and rear walls, and a partition extending between said side walls forwardly from said rear wall to form a front compartment accessible from above the container and a rear compartment accessible through the rear wall;

two ground wheels located alongside the container side walls proximate to the container rear wall, and a pulling handle attached to the container front wall, whereby the cooler can be transported from place to place without physically lifting the container;

said container side walls having upper edges that are longitudinally recessed to provide support ledges spanning the front and rear compartments;

a removable cover having side edge areas seatable on said support ledges;

said cover comprising a front cover section adapted to overlie the front compartment and a rear cover section adapted to extend across said rear compartment;

sockets formed in the upper edges of the container side walls proximate to the plane of the container rear wall;

pivot pins extending from said cover for disposition in said sockets;

said cover being reversible so that the rear section of the cover extends angularly upwardly from the front cover section, whereby a person can sit on the front section of the cover while resting his back against the rear section of the cover;

said sockets serving as journals for the pivot pins, whereby the cover can be swung around the pivot pin axis for access to the front compartment without disengaging the cover from the container; and said pivot pins being cylindrical, and said sockets having semi-cylindrical surfaces engageable with the pin surfaces, whereby the pins are freely turnable in the sockets while being liftable out of the sockets when it is desired to disengage the cover from the container.

2. The mobile cooler, as described in claim 1, and further comprising manually-operable latch means for locking the cover to the container.

3. The mobile cooler, as described in claim 2, wherein said latch means comprises two slidable latch rods carried by said cover remote from said cylindrical pins, and pockets in the container side walls for receiving the ends of said slidable latch rods.

4. The mobile cooler, as described in claim 3, wherein said slidable latch rods are parallel to the cylindrical pins.

* * * * *